May 26, 1925.

R. CHILTON

ENGINE STARTING APPARATUS

Filed Feb. 4, 1919

1,539,075

2 Sheets-Sheet 2

INVENTOR
ROLAND CHILTON

BY

ATTORNEY

Patented May 26, 1925.

1,539,075

UNITED STATES PATENT OFFICE.

ROLAND CHILTON, OF MATAWAN, NEW JERSEY, ASSIGNOR, BY MESNE ASSIGNMENTS, TO ECLIPSE MACHINE COMPANY, OF NEW YORK, N. Y., A CORPORATION OF NEW YORK.

ENGINE-STARTING APPARATUS.

Application filed February 4, 1919. Serial No. 274,988.

*To all whom it may concern:*

Be it known that I, ROLAND CHILTON, a subject of the King of England, and a resident of Matawan, in the county of Monmouth and State of New Jersey, have invented an Improvement in Engine-Starting Apparatus, of which the following is a specification.

This invention relates to starting apparatus and with regard to the more specific features thereof, to means for starting internal combustion engines.

One of the objects is to provide practical, reliable and compact means for starting a source of power.

Another object is to provide means of the above type, of simple and durable construction susceptible of easy application with respect to the engine.

Another object is to provide means of the above type which shall be convenient in control and whose action is automatic.

Other objects will be in part obvious, in part pointed out hereinafter.

The invention accordingly consists in the features of construction, combinations of elements and arrangement of parts which will be exemplified in the construction hereinafter set forth, and the scope of the application of which will be indicated in the following claims.

Figure 1:
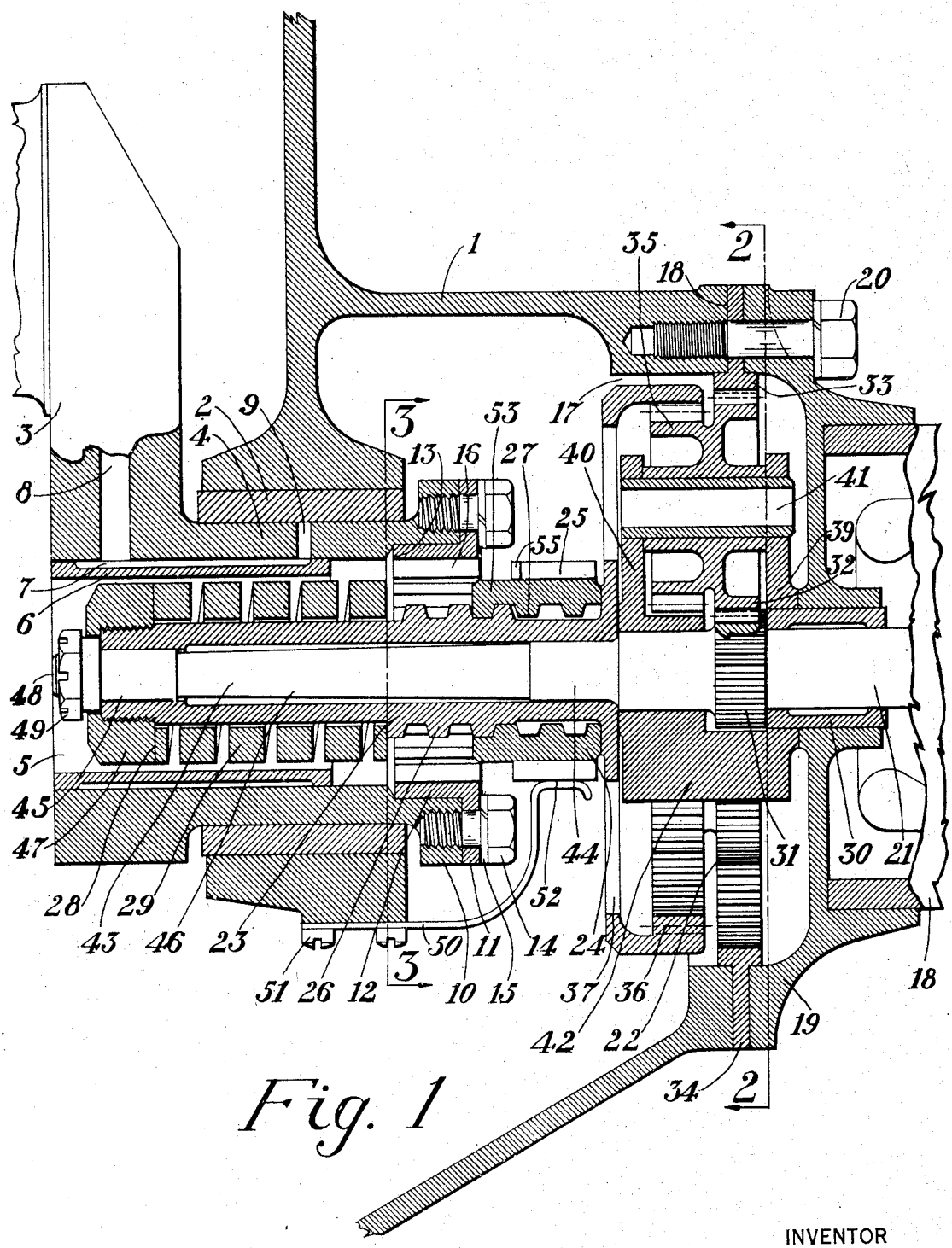
Figure 2:
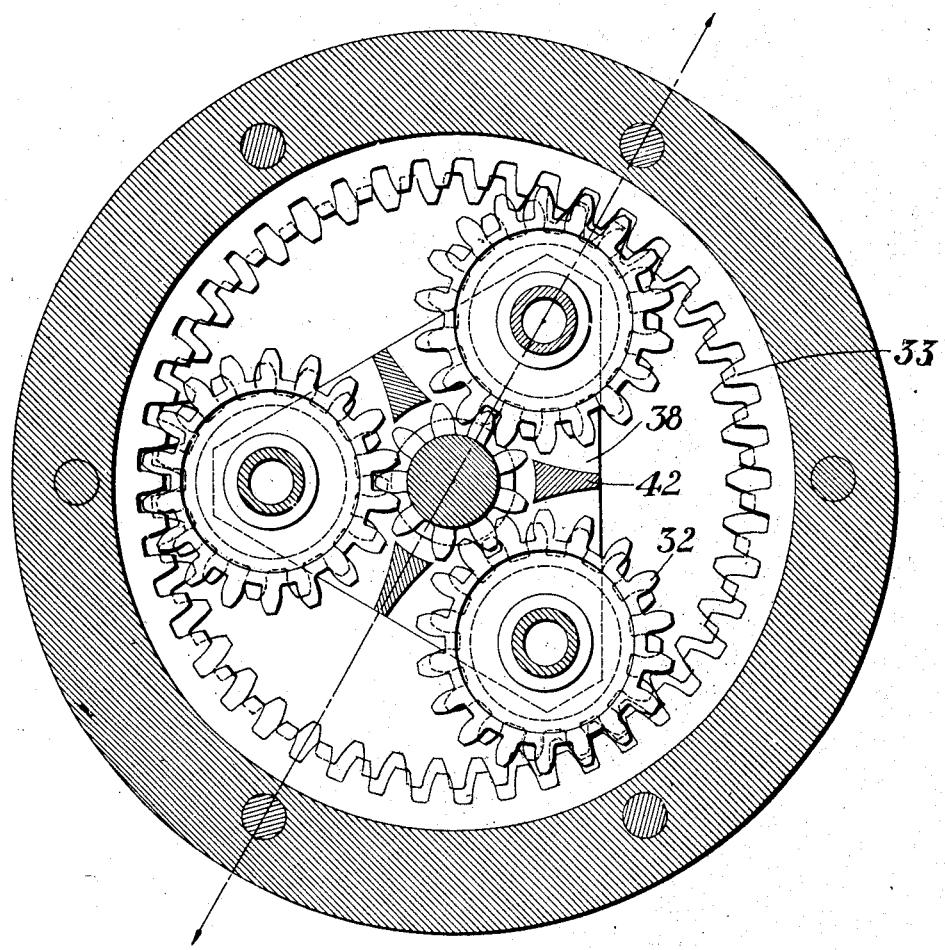
Figure 3:
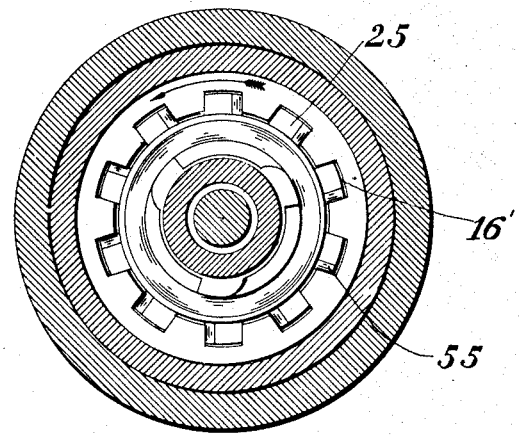

In the accompanying drawings wherein is shown one of various possible embodiments of the several features of this invention, Fig. 1 is a fragmentary view of an engine with my starter applied thereto shown in longitudinal section. Fig. 2 is a transverse sectional view taken along the line 2—2 of Fig. 1 and viewed in the direction of the arrows. Fig. 3 is a transverse sectional view taken along the line 3—3 of Fig. 1 and viewed in the direction of the arrows.

Similar reference characters refer to similar parts throughout the several views of the drawings.

This invention is particularly applicable to engines having hollow crankshaft journals and is especially useful in connection with airplane engines. It is to be understood however that the invention is applicable to advantage to other types of engines incapable of starting under their own power, whether stationary or for propelling vehicles and without regard to the crankshaft construction.

Referring now the drawings, I have shown a portion 1 of the crankcase of an engine, having an end bearing 2 therein for the journal portion 4 of crankshaft 3, said journal portion being preferably hollow as shown at 5. The hollow journal portion is preferably provided with a sleeve 6 having a circumferential depression 7 on the outside thereof extending for the greater part of its length, to connect oil duct 8 in the end crank throw with duct 9 through the journal so as to form a passage for lubricating oil from one to the other duct.

At the extreme end of the journal portion 4 I preferably provide a flange 10 against which rests the flange 11 of a cylindrical insert 12, extending for a short distance into the journal, the opening in said journal being somewhat enlarged along the length corresponding to the insert. The insert 12 is preferably secured to the crankshaft by bolts 14 passing through flanges 10 and 11 and held in place by lock washers 15. The interior of insert 12, is preferably provided with a number of equidistant splines 16 having slots 16' therebetween substantially rectangular in cross section, said splines extending substantially the length of said insert. It is to be understood that although I prefer to apply the splines 16 to the crankshaft in the manner shown and described, this specific construction taken by itself is no part of my invention and other means may be employed for applying splines or their equivalent to the crankshaft.

The crankcase is preferably provided with a circular opening 17, whose center is preferably on the prolonged axis of journal portion 4, and an electric motor 18 provided with a flanged end head 19 is preferably mounted with its shaft 21 along the continued axis of the journal portion 4, this motor being preferably secured to the crankcase, to be supported thereby, by means of bolts 20, all as more fully set forth below.

A torque multiplying mechanism 22 to be more fully described below preferably transmits the torque of the motor to a shaft 23 extending centrally into the journal portion. A driving member 24 is preferably mounted on said shaft and provided with splines 25 of substantially the length of splines 16, the driving member being preferably wider than the length of said splines, there being thus an extension 53 thereon beyond the splines. Member 24 is adapted to mesh between the splines 16 of the crankshaft for clutching action but is normally out of engagement therewith as shown in Fig. 1. Other clutching means may be employed but it is to be understood that there are especially beneficial results to be derived from the specific construction set forth.

Any desired means may be employed for shifting the driving member 24 into co-operation with the crankshaft, but I prefer to employ an automatic means and of the screw shaft type now to be more fully described. For this purpose the shaft 23 is provided with threads 26 along a part of its length the driving member being threaded upon said shaft as shown at 27. I prefer to make the angle of the threads sufficiently steep to render the driving member incapable of sustaining axial pressure during its movement to full mesh so that it will recede from any agent tending to impose such end pressure, by rotation of said driving member on the threads. To facilitate meshing or clutching, splines 25 are preferably beveled as shown at 55 on their non-driving sides at the end adjacent the crankshaft.

The shaft 23 is also preferably provided with a nut 47 threaded to the outer end thereof forming a shoulder 28 on said shaft. A relatively heavy compression spring 29 encircles shaft 23, abuts shoulder 28 at one end and lies in the path of driving member 24 when traveling toward meshing position. A leaf spring 50 is preferably secured to the crankcase by screws as at 51 and is bent to press preferably against the outer faces of splines 25 as at 52 for a purpose to be described more fully below. Other forms of screw shaft transmissions may be used with good results, but it is to be understood that there are particularly beneficial features in the use of the specific construction shown and described.

For lightness and reliability of construction I preferably construct the shaft 23 in the hollow or sleeve form indicated on the drawings, forming an extension 43 on armature shaft 21 to pass centrally through the sleeve. The shaft extension 43 is preferably formed to fit snugly within the sleeve 23 at its ends as at 44 and 45, said ends thus forming internal bearings for said sleeve. The intermediate portion of shaft extension 43 may be tapered as at 46 and out of contact with the interior of sleeve 23. The shaft extension 43 preferably extends beyond nut 47 at the end of sleeve 23 as shown at 48 and a locknut 49 is threaded onto said end to prevent the sleeve 23 with its associated parts from moving longitudinally with respect to the armature shaft, free rotation of said sleeve being however permitted.

My preferred torque multiplying mechanism between the armature shaft and hollow shaft or sleeve 23 will now be described. In close proximity to motor bearing 30 and rigid with the armature shaft I provide a pinion 31 in continual mesh with a plurality of, preferably three, equally spaced identical planetary gears, one of which is shown at 32. The planetary gears 32 are encircled by and in mesh with a non-rotatable internal gear member 33 preferably provided with an integral flange 34 clamped in place by bolts 20 between the motor-head 19 and the faced crankcase surface 18 bounding opening 17. Formed rigid with planetary gears 32 I provide concentric planetary gears members 35 of a smaller diameter and lesser number of teeth which are in mesh with a rotatable internal gear 36 of somewhat smaller diameter and lesser number of teeth than internal gear 33. The internal gear 36 is preferably formed integral with shaft or sleeve 23, a flange 37 of substantially the diameter of gear 36 connecting said gear with said shaft.

If desired, the plurality of planetary gears may be connected to each other by a spider construction 38 comprising preferably centrally perforated triangular plates 39 and 40 on opposite sides thereof, connected by integral ribs 42 cut away to allow space for the planetary gears. Extending between plates 39 and 40, and perpendicularly thereto, are pins 41, one pin passing centrally through and aiding to support each planetary gear unit 32—35.

By way of example, if a torque multiplication of fifty-six is found desirable, the planetary gearing 22 just described may be constructed with nine teeth on pinion 31, eighteen teeth on each of planetary gears 32, fifteen teeth on each of planetary gears 35, forty-five teeth on stationary internal gear 33 and forty-two teeth on internal gear 36. It is to be understood that by proper choice of gears other torque multiplication may be effected in accordance with requirements.

Other torque multiplying means, planetary or otherwise may be employed to advantage for my purpose, but I derive particularly desirable results from the use of the specific arrangement shown and described.

The manner of assembly of my construction is substantially as follows: the motor with its extended armature shaft having been previously assembled the planetary spider unit made up of plates 39 and 40 with planetary gears 32—35 therebetween is slipped over the free end of shaft extension 43, gears 32 in advance, until the teeth of said gears mesh with pinion 31. Internal gear 33 with its integral flange 34 is then passed over said shaft extension until said gear comes into mesh with the planetary gears 32.

Thereupon the driving member 24 is threaded upon hollow shaft or sleeve 23, compression spring 29 is slipped over said shaft, and nut 47 is applied to the end. The hollow shaft assembly just described is then passed over the free end of shaft extension 23 until internal gear 36 which is integral with the sleeve, meshes with gears 35, when locknut 49 is applied to the threaded end 48 of shaft extension 43 to maintain the starter unit in assembled relation.

The transmission end of the assembled starter unit is then passed through opening 17 in the crankcase, the sleeve 23 with its associated parts passing centrally into journal portion 4 and the driving member 24 coming into engagement with leaf spring 52. The internal gear 33 is then adjusted to bring the screw openings in its flange 34 into alignment with the screw openings in the crankcase and screws 20 are then applied to secure the entire construction in assembled relation.

The operation of my construction is substantially as follows: Preliminary adjustments having been made, the starting switch (not shown) is closed, to connect the motor 18 with the battery or other source of current (not shown). The motor starts rotation and the pinion 31 thereon drives planetary gears 32 around the internal gear 33, the planetary gear members 35 connected to gears 32 transmitting a greatly increased torque at a greatly reduced speed to internal gear 37, all according to the well known action of planetary gearing of the type set forth. Sleeve 23 now turns with gear 37 on internal bearings 44 and 45, but driving member 24 which is threaded thereon does not at once assume the rate of rotation of shaft 23 by reason of its inertia and by reason of the frictional contact of the spring 50 with its splines. The driving member therefore travels longitudinally along threads 26 until splines 25 mesh between splines 16 on the crank shaft at which time said driving member is out of contact with spring 50. Bevel 55 on the driving splines 25 aids to initiate such meshing. After initial engagement between the splines, and before complete meshing has been effected, the extension 53 of the driving member comes into engagement with compression spring 29, thus offering gradually increased resistance to the longitudinal movement of the driving member as it comes into full co-operation with the crankshaft. When splines 25 are in full mesh with the corresponding splines on the crankshaft the resistance offered by compressed spring 29 is so high that substantial further longitudinal movement is prevented and the driving member 24 is constrained to rotate with sleeve 23. The splines 25 co-operating with the corresponding splines in the crankshaft constitute a clutch whereby the crankshaft is compelled to rotate in unison with the sleeve 23, the driving member 24 thus turning over the engine.

As the cranking torque is applied to the crankshaft in close proximity to a bearing thereof, the cranking action takes place without the vibration which might occur if the torque were applied at some part of the shaft not as steadily supported. As the end thrust of the clutching or driving member is taken by the spring 29 and not by the crankshaft, it will be seen that only a rotary cranking impulse is applied to the engine by the starter and there is no tendency for the starter to force the crankshaft laterally along its bearings.

When the engine starts under its own power, it imparts to the driving member 24 through its splines 25 a rate of rotation in excess of that imparted to shaft 23 by the starting motor and the driving member 24 is caused to overrun the threads 26 in the well-known manner until it is in the out-of-mesh or home position and in contact with spring 50 as shown in Fig. 1 of the drawings. Should the driving member 24 after being brought to home position tend to bounce back toward mesh with the crankshaft, no damage would occur, as the peripheral speed of the clutching surface on the crankshaft which is of relatively small diameter, is relatively low, and the driving member will therefore be gently pushed back to out-of-mesh position by contact of the ends of the splines with each other.

If the entire torque multiplying transmission were not interposed between the starting motor and the driving member, and the said driving member instead of co-operating with an engine part of small diameter were accordingly made to co-operate with the periphery of a fly-wheel member or other part of relatively large diameter, then undesired bouncing back of the driving member while the engine is running might by reason of the relatively large peripheral speed of said engine member cause substantial damage to the teeth of either or both of said co-operating elements, unless special means were provided to prevent such bouncing back.

If upon starting of the motor the ends of splines 25 should abut the ends of splines 16, jamming will not occur, since as above noted, threads 26 are made sufficiently steep to render the driving member incapable of sustaining axial pressure. The driving member will accordingly rotate and after a slight turning movement the splines on the driving member will be in proper alignment with the slots 16' between the splines on the crankshaft whereupon meshing and the subsequent action proceed in the normal manner described above.

During running operation of the engine, spring 50 performs the further function of preventing rotation of the driving member 24 with consequent avoidance of undesired longitudinal movement of such member into contact with the crankshaft.

Although I have shown my invention in a preferred outboard embodiment, it may be carried out with good results in inboard form. It is to be understood however that I prefer to employ the form shown and described.

It is also to be understood that although my starter operates upon the end of the crankshaft, it may be carried out with beneficial results if it is made to take hold of some other part of the engine and that other forms of clutching engagement may be provided. It is also to be understood that I may mount my starting motor with respect to the vehicle in manners and by means other than set forth above. With regard to each of these features, however, I prefer the specific construction shown and described.

It will thus be seen that there is herein described apparatus in which the several features of this invention are embodied, and which apparatus in its action attains the various objects of the invention and is well suited to meet the requirements of practical use.

As many changes could be made in the above construction, and many apparently widely different embodiments of this invention could be made without departing from the scope thereof, it is intended that all matter contained in the above description or shown in the accompanying drawings shall be interpreted as illustrative and not in a limiting sense.

Having thus described my invention, what I claim as new and desire to secure by Letters Patent is:—

1. In starting apparatus, in combination an engine crank shaft which is hollow at one end, a motor driven rotatable shaft extending into the crank shaft axially thereof, a driving member mounted on the driven shaft for longitudinal movement thereof into engagement with the crank shaft, and for rotary movement with such driven shaft for the rotation of the crank shaft.

2. In starting apparatus, in combination an engine crank shaft which is hollow at one end, a motor driven rotatable shaft extending into the crank shaft axially thereof, said driven shaft having a supporting bearing extraneous of the crank shaft and being unsupported at its inner end within the crank shaft, a driving member mounted on the driven shaft for longitudinal movement thereof into engagement with the crank shaft, and for rotary movement with such driven shaft for the rotation of the crank shaft.

3. In starting apparatus, in combination, an engine crank shaft which is hollow at one end, a motor driven rotatable shaft extending into the crank shaft axially thereof, a driving member mounted on the motor driven shaft for longitudinal movement thereof into the crank shaft and into engagement with the interior wall thereof, and for rotary movement with such driven shaft for the rotation of the crank shaft.

4. In starting apparatus, in combination, an engine crank shaft which is hollow at one end, a motor driven rotatable shaft which is screw threaded and which extends into the crank shaft axially thereof, a nut threaded on the motor driven shaft for longitudinal movement into the crank shaft and into engagement with the interior wall thereof, and for rotary movement with such driven shaft for the rotation of the crank shaft.

5. In starting apparatus, in combination, an engine crank shaft which is hollow at one end and therein provided with spline grooves, a motor driven shaft extending into the crank shaft axially thereof, a driving member having peripheral splines and mounted on the motor driven shaft for longitudinal movement thereof to effect engagement of said splines and grooves, and for rotary movement with such driven shaft for the rotation of the crank shaft.

6. In starting apparatus, in combination, an engine crank shaft which is hollow at one end, a motor driven rotatable shaft which is screw threaded and which extends into the crank shaft axially thereof, a nut threaded on the motor driven shaft for longitudinal movement into the crank shaft and into engagement with the interior wall thereof, and for rotary movement with such driven shaft for the rotation of the crank shaft, and a spring located within the crank shaft and encircling the driven shaft, such spring being in the path of movement of the nut and adapted to be compressed thereby.

7. In an engine starter unit, in combination, a motor having an extended shaft, a sleeve member on said shaft, a driving member on said sleeve, torque multiplying mechanism between said shaft and said sleeve, and means associated with said sleeve for causing automatic movement of said driving member from inoperative to operative position.

8. A starter for gas engines comprising in combination, with a motor-driven shaft, a screw-threaded sleeve mounted thereon and adapted to be driven thereby, a driving member which is screw-threaded upon said sleeve and adapted to travel longitudinally thereon when the shaft and its sleeve are rotated, and a torque multiplying transmission between said shaft and said sleeve.

9. In starting apparatus, in combination, an engine having a crankshaft, a starting motor, said motor having two shafts co-axial with each other and with said crankshaft, a torque multiplying connection between said two motor shafts, and a member for clutching said crankshaft mounted on one said shaft and normally out of engagement with said crankshaft.

10. In starting apparatus, in combination, an engine having a crankshaft, a first clutching member on the end thereof, a starting motor having a shaft, a sleeve co-axial with said shaft and in alignment with said crankshaft end, a torque multiplying connection between said shaft and said sleeve, a second clutching member mounted on said sleeve and normally out of engagement with said first clutching member, and means for causing automatic shifting of said second clutching member into driving engagement with said first clutching member and for thereupon transmitting a cranking torque.

11. In starting apparatus, in combination, an engine having a crankshaft, internal splines substantially at one end thereof, a starting motor having a shaft, a threaded sleeve mounted thereon, and in alignment with said crankshaft end, a torque multiplying connection between said shaft and said sleeve, and a splined member threaded on said sleeve adapted to mesh with the splines in said crankshaft but normally out of engagement therewith.

12. In engine starting apparatus, in combination, a crankshaft having a hollow end journal portion, a starter unit mounted on said engine and having a portion extending into said hollow portion, and clutching means, having cooperating elements, one on said unit and one on said crankshaft, said elements being normally disengaged.

13. In engine starting apparatus, in combination, a crankshaft having a hollow end journal portion a starter unit mounted on said engine and having a portion extending into said hollow portion, and means adapted to transmit torque from said extending portion to said hollow journal portion, said means when in driving relation, being substantially within said hollow portion.

14. In engine starting apparatus, in combination, a crankshaft having bearings, internal splines rigid with the end of said crankshaft and extending into one of said bearings, a starting motor having a shaft, a splined member mounted thereon, and means for shifting said splined member into mesh with said internal splines, to permit transmission of a cranking torque.

15. In engine starting apparatus, in combination, a crankshaft having a hollow end journal portion, splines therein, a starter unit having a shaft extending into said hollow portion, a splined member mounted on said shaft and normally outside of said hollow portion, and means responsive to the starting of the motor for shifting said splined member into mesh with the splines in said journal portion, and for then transmitting cranking torque from said shaft through said splined member to said crankshaft.

16. In engine starting apparatus, in combination, an engine, a crankshaft therefor having a hollow end journal portion, splines therein, a starter unit mounted on said engine and having a shaft extending into said journal portion, a threaded sleeve mounted on said shaft and also extending into said journal portion, a torque multiplying connection between said shaft and said sleeve, and a splined member threaded on said sleeve, adapted to mesh with the splines in said crankshaft but normally out of engagement therewith.

17. In engine starting apparatus, in combination, a crankshaft having a hollow end journal portion, a starter unit having a shaft extending into said hollow portion, a clutching member mounted on said shaft and normally beyond said crankshaft, means responsive to the energization of said starter unit, to urge said clutching member into said hollow portion for clutching the same, and means for yieldingly arresting said clutching member when in driving position.

18. In engine starting apparatus, in combination, an engine, a crankshaft therefor having a hollow end journal portion, splines formed therein, a starting motor mounted on said engine, and having a threaded shaft extending into said journal portion, a compression spring within said portion and surrounding said shaft, and a toothed member threaded on said shaft, adapted to come into mesh with said splines against the compression of said spring upon starting of said motor.

19. In engine starting apparatus, in combination, an engine, a crankshaft therefor having a hollow end journal portion, a starting motor mounted on said engine, a prolonged shaft therefor extending into said journal, a threaded sleeve surrounding said shaft, and also extending into said journal, means connected between said shaft and said sleeve and outside said journal, for effecting torque multiplication therebetween, a clutching member threaded on said shaft, a shoulder near the inner end of said sleeve, and a compression spring surrounding said sleeve and abutting said shoulder, and in the path of said clutching member when coming into clutching engagement with said journal portion.

20. In starting apparatus, in combination, an engine, a crankshaft therefor having a journal, a bearing for said journal, a starting motor mounted on said engine, a shaft driven therefrom, a driving member on said shaft normally out of engagement with said engine, and means to move said driving member away from said motor for driving engagement with said journal, said bearing performing the function of a bearing for said shaft during cranking action.

21. In starting apparatus, in combination, an engine having a crankcase, a crankshaft therein, said crankcase having an opening, a starting motor secured about said opening, a threaded shaft co-axial with said crankshaft, and driven from said motor and a member connected to said shaft, disposed within said crankcase and arranged to automatically clutch the end of said crankshaft for cranking.

22. In apparatus of the above character described, in combination, an engine crankshaft, a motor, a torque multiplying mechanism, and a screw shaft connected in series to said motor and a driving member associated with said screw shaft, and normally out of engagement with said crankshaft, all said elements being coaxial.

23. An engine starter, comprising in combination, a motor, having an extended shaft, a threaded sleeve member mounted thereon, a planetary reduction gearing between said shaft and said sleeve, said gearing including an internal gear concentric and integral with said sleeve member, and a driving member threaded on said sleeve.

24. An engine starter comprising in combination, a motor, an extended shaft therefor, planetary reduction gearing driven from said shaft, a threaded sleeve surrounding said shaft and having an internal gear rigid therewith, said gear constituting a part of said gearing, a unitary member on the end of said shaft for preventing said sleeve from moving longitudinally, and a driving member threaded on said sleeve.

25. In starting apparatus, in combination, an engine having a bearing and a journal therein, internal splines rigid with, adjacent and parallel to said journal, a starting motor, a toothed driving member connected thereto, coaxial with and normally spaced from said journal, means responsive to the starting of said motor for urging said driving member into mesh with said splines, and means distinct from said crankshaft for taking the end thrust of said driving member.

26. In combination, an engine having a crankshaft, an end journal therefor, internal splines rigid with, adjacent and parallel to said journal, a starting unit comprising a motor, a threaded element driven therefrom, a toothed driving member cooperating therewith to be urged forward into mesh with said splines upon starting of said motor, and stop means for taking the end thrust of said driving member, said stop means constituting a part of said starting unit.

27. The combination, in an engine starting apparatus, of a crankshaft, an end journal therefor, splines formed in a cavity in said end journal, a starting unit including a motor, a threaded element driven therefrom, a toothed driving member cooperating therewith to be urged forward into mesh with said splines upon starting of said motor, and compression spring means for yieldingly arresting said driving member when it reaches driving position.

In testimony whereof, I have signed my name to this specification this 20th day of January, 1919.

ROLAND CHILTON.